United States Patent
Wang et al.

(10) Patent No.: US 10,623,372 B2
(45) Date of Patent: Apr. 14, 2020

(54) LOAD BALANCING IPSEC TUNNEL PROCESSING WITH EXTENDED BERKELEY PACKET FILTER (EBPF)

(71) Applicant: Nicira, Inc., Palo Alto, CA (US)

(72) Inventors: Yong Wang, Sunnyvale, CA (US); Brenden Blanco, Palo Alto, CA (US); Ly Loi, Los Altos, CA (US)

(73) Assignee: Nicira, Inc., Palo Alto, CA (US)

( * ) Notice: Subject to any disclaimer, the term of this patent is extended or adjusted under 35 U.S.C. 154(b) by 285 days.

(21) Appl. No.: 15/833,092

(22) Filed: Dec. 6, 2017

(65) Prior Publication Data

US 2019/0173841 A1  Jun. 6, 2019

(51) Int. Cl.
- H04L 29/06 (2006.01)
- G06F 9/50 (2006.01)
- H04L 12/741 (2013.01)
- H04L 12/931 (2013.01)

(52) U.S. Cl.
CPC ........ *H04L 63/0227* (2013.01); *G06F 9/5083* (2013.01); *H04L 45/74* (2013.01); *H04L 49/70* (2013.01); *H04L 63/029* (2013.01); *H04L 63/0272* (2013.01); *H04L 63/0428* (2013.01); *H04L 63/164* (2013.01); *H04L 63/0236* (2013.01)

(58) Field of Classification Search
None
See application file for complete search history.

(56) References Cited

U.S. PATENT DOCUMENTS

| | | | |
|---|---|---|---|
| 2016/0085571 A1* | 3/2016 | Kim | G06F 9/48 718/1 |
| 2016/0087888 A1* | 3/2016 | Jain | H04L 67/10 370/389 |
| 2016/0092259 A1* | 3/2016 | Mehta | G06F 9/45558 718/1 |
| 2016/0212098 A1* | 7/2016 | Roch | H04L 63/029 |
| 2017/0005931 A1* | 1/2017 | Mehta | H04L 45/7453 |
| 2017/0063979 A1* | 3/2017 | Saeki | G06F 13/12 |
| 2018/0069924 A1* | 3/2018 | Tumuluru | H04L 41/0803 |
| 2018/0191642 A1* | 7/2018 | Biederman | H04L 47/22 |
| 2019/0140984 A1* | 5/2019 | Agarwal | H04L 49/9047 |
| 2019/0173841 A1* | 6/2019 | Wang | H04L 63/164 |
| 2019/0173850 A1* | 6/2019 | Jain | H04L 9/088 |
| 2019/0173851 A1* | 6/2019 | Jain | H04L 45/04 |
| 2019/0173920 A1* | 6/2019 | Gopal | H04L 63/164 |

OTHER PUBLICATIONS

Son, Jeongseok et al. "Protego: Cloud-Scale Multitenant IPsec Gateway." USENIX Annual Technical Conference (2017). (Year: 2017).*

(Continued)

*Primary Examiner* — Jeffery L Williams
(74) *Attorney, Agent, or Firm* — Patterson + Sheridan, LLP

(57) ABSTRACT

Certain embodiments described herein are generally directed to load balancing IPSec tunnels at an extended Berkeley Packet Filter (eBPF) module of a destination tunnel endpoint for encapsulated ESP encrypted data packets for encapsulated encrypted data packets based on a security parameter index value of the encapsulated encrypted data packets.

30 Claims, 4 Drawing Sheets

(56) References Cited

OTHER PUBLICATIONS

S. Muramatsu, R. Kawashima, S. Saito and H. Matsuo, "VSE: Virtual Switch Extension for Adaptive CPU Core Assignment in Softirq," 2014 IEEE 6th International Conference on Cloud Computing Technology and Science, Singapore, 2014, pp. 923-928. doi: 10.1109/CloudCom.2014.68 (Year: 2014).*
Y. Ye, R. West, J. Zhang and Z. Cheng, "MARACAS: A Real-Time Multicore VCPU Scheduling Framework," 2016 IEEE Real-Time Systems Symposium (RTSS), Porto, 2016, pp. 179-190. doi: 10.1109/RTSS.2016.026 (Year: 2016).*
https://patchwork.ozlabs.org/cover/826223/—Oct. 16, 2017.

* cited by examiner

LOAD BALANCING IPSEC TUNNEL PROCESSING WITH EXTENDED BERKELEY PACKET FILTER (EBPF)

BACKGROUND

IP security protocols are widely used to protect packets communicated between endpoints (EPs), such as over the Internet, between gateways, between data centers (e.g., on premises data centers, cloud data centers, etc.), within data centers, etc. For example, security associations (SAs) may be established between the endpoints. In some embodiments, each security association is a one-way or simplex connection, and therefore at least two security associations, one for each direction, are established between two IPsec peers (e.g., endpoints). These security associations are a form of contract between the endpoints detailing how to exchange and protect information among each other. In some embodiments, each security association is comprised of a mutually agreed-upon key, one or more security protocols, and/or a security parameter index (SPI) value. After security associations have been established between two endpoints, an IPsec protocol may be used to protect data packets for transmission.

For IPsec in the Encapsulating Security Payload (ESP) tunnel mode, tunnel endpoints are used for applying IPsec protocols to encrypt and encapsulate egress packets from a source endpoint and decrypt and decapsulate ingress packets for a destination endpoint to secure communication between the endpoints. For example, a source endpoint may generate and route egress IP packets to a source tunnel endpoint associated with the source endpoint. In particular, the source endpoint may generate an IP packet including a header with the IP address of the source endpoint set as the source IP address and the IP address of the destination endpoint set as the destination IP address. A MAC address of the source tunnel endpoint may further be set as a next-hop MAC address of the IP packet in the header.

The source tunnel endpoint receives the IP packet and encrypts the original IP packet including the header of the original IP packet based on a security association established between the source tunnel endpoint and the destination tunnel endpoint. For example, the source tunnel endpoint encrypts the original IP packet with a mutually agreed-upon key of the security association between the source endpoint and the destination endpoint. The source tunnel endpoint further encapsulates the encrypted packet by adding a new IP header and an ESP header (e.g., including an SPI value corresponding to the security association used to encrypt the packet) to the encrypted packet to generate an encapsulated ESP encrypted data packet. The new IP header includes a source IP address of the source tunnel endpoint and a destination IP address of the destination tunnel endpoint. The new IP header is used to forward the encapsulated ESP encrypted data packet through a network from the source tunnel endpoint to the destination tunnel endpoint.

The destination tunnel endpoint may then decapsulate and decrypt the encapsulated ESP encrypted data packet to extract the original IP packet. For example, the destination tunnel endpoint may determine the security association (e.g., mutually agreed-upon key) to use to decrypt the encapsulated ESP encrypted data packet based on the SPI value included in the ESP header. Based on the destination IP address in the header of the original IP packet, the destination tunnel endpoint forwards the original IP packet to the destination endpoint.

IPsec protocols may be deployed in virtualized computing instances (e.g., a virtual machine (VM) or container) to gain the benefits of virtualization and network functions virtualization (NFV). For example, virtual computing instances may be configured to serve as tunnel endpoints as described. However, use of such IPsec protocols by virtualized computing instances may cause certain other features at the virtualized computing instances to function improperly.

In a virtualized environment, virtual network interface controllers (VNICs) are instantiated in a virtualization layer (also referred to herein as the "hypervisor") supporting such virtualized computing instances and are programmed to behave similarly to physical NICs (PNICs). One feature both PNICs and VNICs have supported is receive side scaling (RSS), which involves computing a hash of incoming packet header attributes and distributing the incoming network traffic across CPUs for processing based on the computed hash values. Packets belonging to the same connection are distributed to the same RSS queue, based on the computed hash value, for processing by a particular CPU. For a VNIC, packets are distributed to virtual RSS queues associated with the VNIC based on the computed hash value. The packets in a virtual RSS queue are processed by a particular virtual CPU associated with the virtual RSS queue.

Traditionally, for a VNIC, RSS is performed for IP packets based on a detected packet type indicated by an IP protocol number in an IP header of the packet that indicates the next higher layer protocol being carried as the IP payload. For example, the VNIC may be configured to perform RSS only for packets of type ICMP, UDP, and TCP, corresponding to IP protocol numbers 1, 6, and 17, respectively. However, for packets encapsulated using ESP tunnel mode, the IP protocol number in the new IP header may be 50. Accordingly, the VNIC may not be configured to perform RSS for received encapsulated ESP encrypted data packets.

Further, the hash computed for selecting a RSS queue is traditionally computed based on the source IP address and destination IP address in the header of the packet. In an encapsulated ESP encrypted data packet, the only available (i.e., non-encrypted) IP addresses for computing the hash are the source IP address of the source tunnel endpoint and the destination IP address of the destination tunnel endpoint. Accordingly, at a VNIC of a destination tunnel endpoint, all encapsulated ESP encrypted data packets received from the same source tunnel endpoint, regardless of the source endpoint that sent the packet and the destination endpoint, would have the same source IP address and destination IP address in the new IP header, and therefore hash to the same value and be assigned to the same virtual RSS queue. Therefore, RSS could not be used to distribute processing of such encapsulated ESP encrypted data packets amongst multiple virtual RSS queues and accordingly multiple virtual CPUs.

In some cases, VNICs may be configured to perform RSS for received encapsulated ESP encrypted data packets. For example, the VNIC may be configured to compute a hash of incoming packet header attributes, including an SPI value associated with each packet, and distribute the incoming network traffic across CPUs for processing based on the computed hash values. However, even in such cases, unless there is a very large number (e.g., thousands) of IPSec tunnels (e.g., such that there are many different combinations of source and destination tunnel endpoint IP addresses) or many different security associations (e.g., such that there are many different SPI values, in cases where there is a single IPSec tunnel), it is very unlikely that the RSS performed by the VNIC results in a statistically uniform distribution of packets to virtual CPUs.

SUMMARY

Herein described are one or more embodiments of a method for processing encapsulated encrypted data packets at an extended Berkeley Packet Filter (eBPF) module on a host machine. The method includes receiving, at the eBPF module, an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint. The method further includes selecting a CPU core ID from a plurality of CPU cored IDs based at least in part on the SPI value, wherein the CPU core ID corresponds to a virtual CPU of a plurality of virtual CPUs. The method further includes inserting the CPU core ID into the encapsulated encrypted data packet. The method further includes passing the encapsulated encrypted data packet to a receive packet steering (RPS) module for assignment of the encapsulated encrypted data packet to the virtual CPU based on the CPU core ID.

Also described herein are embodiments of a non-transitory computer readable medium comprising instructions to be executed in a computer system, wherein the instructions when executed in the computer system perform the method described above for processing encapsulated encrypted data packets at an eBPF module on a host machine.

Also described herein are embodiments of a computer system, wherein software for the computer system is programmed to execute the method described above for processing encapsulated encrypted data packets at an eBPF module on a host machine.

Also described herein are embodiments of a computer system comprising means for executing the method described above for processing encapsulated encrypted data packets at an eBPF module on a host machine.

DETAILED DESCRIPTION

Embodiments presented herein relate to systems and methods for load balancing processing of packets of IPSec tunnels using an extended Berkeley Packet Filter (eBPF) module of a destination tunnel endpoint.

Figure 1:
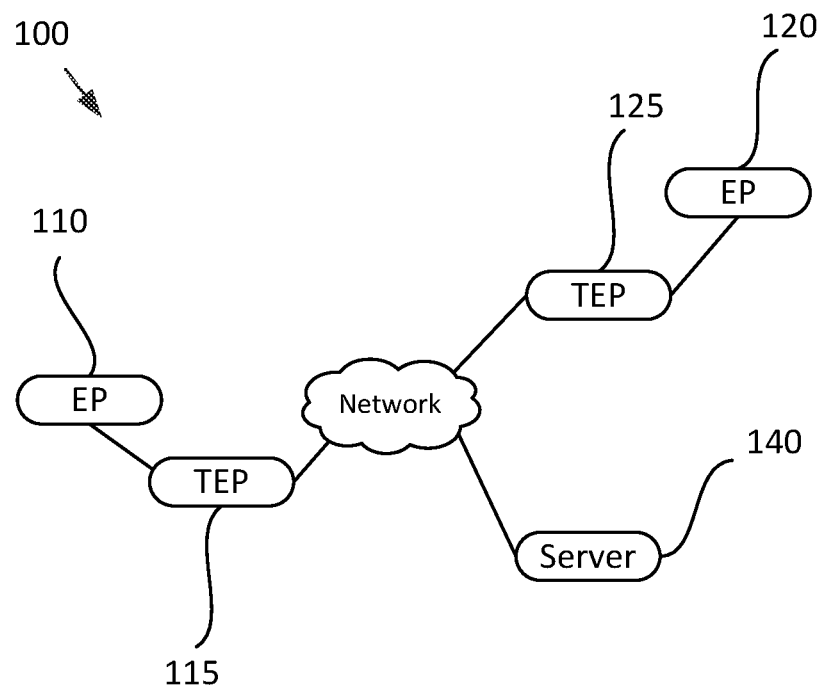
FIG. 1 illustrates an example of a network, in accordance to some embodiments.

FIG. 1 illustrates an example of a network 100, representing a physical network. As shown by FIG. 1, network 100 connects a plurality of tunnel endpoints (TEPs), including TEP 115 and TEP 125, and a server 140. A TEP may be a physical computing device (e.g., physical server, physical host). In certain embodiments, a TEP may be a virtualized computing instance as further discussed herein.

TEPs 115 and 125 may connect endpoints (EPs), including EP 110 and EP 120, in a logical overlay network. An EP refers generally to an originating EP ("source EP") or terminating EP ("destination EP") of a flow of network packets, which can include one or more data packets passed from the source to the destination EP. In practice, an EP may be a physical computing device (e.g., physical server, physical host). In certain embodiments, an EP may be a virtualized computing instance (e.g., virtual machine, container, data compute node, isolated user space instance) as further discussed herein.

In network 100, EPs may communicate with or transmit data packets to other EPs via tunnel endpoints (TEPs) as discussed. EP 110 may transmit a data packet to EP 120 in a secured fashion via TEPs 115 and 125, acting as a source TEP and a destination TEP, respectively. TEPs 115 and 125 may implement IPsec protocols, including ESP tunnel mode, to secure communication between one another. In some embodiments, before any data can be securely transferred using the IPsec framework, security associations (e.g., including a mutually agreed-upon key, one or more security protocols, and/or a SPI value) may need to be established between the two TEPs for the two EPs.

The mutually agreed-upon key (e.g., encryption/decryption key), in some embodiments, is generated by a server (e.g., server 140) and subsequently distributed to TEPs 115 and 125 associated with the EPs 110 and 120. The one or more security protocols, described above, may be one or more IPsec security protocols such as Authentication Header (AH), Encapsulating Security Payload (ESP), etc. After security associations have been established for the two EPs 110 and 120, one or more of these security protocols may be used to protect data packets for transmission. Though certain embodiments are described herein with respect to the ESP security protocol, other suitable IPsec security protocols (e.g., AH protocol) alone or in combination with ESP, may be used in accordance with the embodiments described herein. Further, the embodiments described herein may similarly be used for different types of traffic such as IPv4, IPv6, etc. Further, the techniques described herein for generating and inserting hash values into incoming encapsulated and encrypted data packets, using an eBPF kernel module, may be dynamically turned on or off (e.g., at a TEP) in some embodiments. In certain embodiments, the techniques herein can be used to hash ESP packets encapsulated in other packet types (e.g., VXLAN or Geneve).

In addition to a mutually agreed-upon key and security protocol, a security association includes an SPI value. In some embodiments, each SPI value is a binary value associated with a security association, which enables a TEP to distinguish among multiple active security associations. As an example, SPI values may be used to distinguish between the inbound and outbound security associations of different EPs. In some cases, the Internet Key Exchange (IKE) protocol is used to generate these SPI values and encryption/decryption keys in the IPsec framework. For example, prior to any data exchange, IKE performs a two-phase negotiation session, which results in establishing two security associations between two IPsec peers (e.g., TEPs). These security associations may not only contain mutually agreed-upon encryption and decryption keys to be used for incoming and outgoing traffic (e.g., of an EP), but also maintain sequence numbers for each data transfer. These sequence numbers are maintained to ensure anti-replay, which prevents hackers from injecting or making changes in data packets that travel from a source to a destination TEP. However, if the IKE protocol is used to establish these security associations in a network with, for instance, (N) number of EPs, then each TEP may need to set up (N−1) IKE negotiation sessions for each EP the TEP is associated with.

Accordingly, in some cases, instead of using IKE, distributed network encryption (DNE) may be utilized to simplify key management, including key generation and exchange, and SPI allocation. DNE provides a central unit, e.g. server 140, that generates and distributes encryption/decryption keys and SPI values for EPs to TEPs in a network. DNE also simplifies protecting network traffic of TEPs by allowing users (e.g., network administrators) to define simple security rules and key policies. For example, in some embodiments, server 140 may store, in its memory, a plurality of security rules and key policies. Security rules may be user-defined rules that users input into the central unit through an interface (e.g., via a manager, which may be a physical computing device or a virtualized computing instance supported by a physical computing device). Security rules may define what key policy is used by server 140 to generate an encryption/decryption key for data transfer between TEPs for EPs in a network. In some embodiments, each key policy may be associated with one or more EPs and include certain specifications (e.g., one or more of an algorithm, action, strength of the key, etc.) that define properties of an encryption/decryption key.

Figure 2:
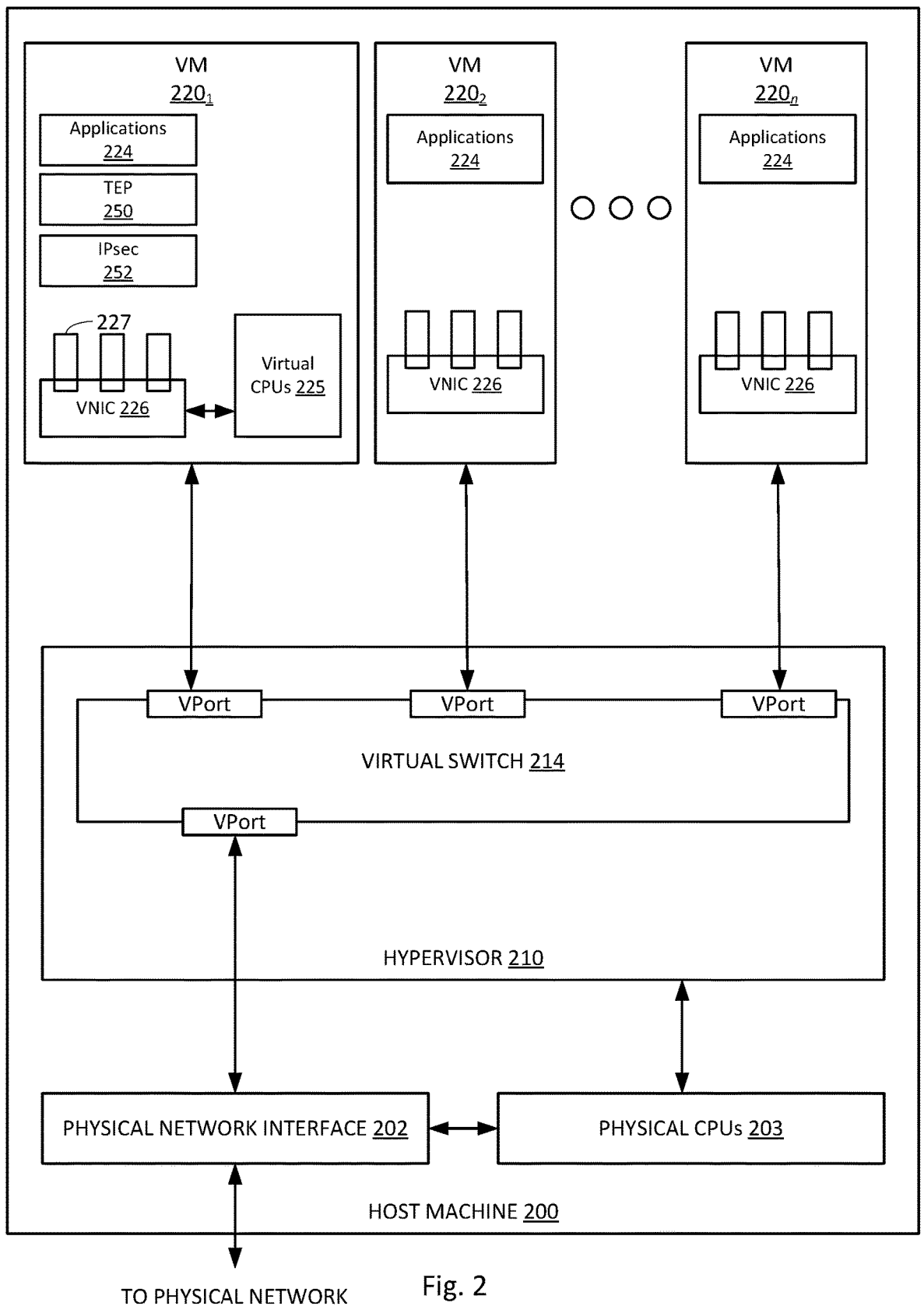
FIG. 2 illustrates an example block diagram of host machine for use in a virtualized network environment, according to some embodiments.

FIG. 2 illustrates an example block diagram of host machine 200 for use in a virtualized network environment, according to some embodiments. As illustrated, host machine 200 includes a physical network interface controller (PNIC) 202, a hypervisor 210, and a plurality of virtual machines $220_1$, $220_2$, ... $220_n$.

Host machine 200 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance). In certain embodiments, host machine 200 is a physical general purpose computer (e.g., a server, workstation, etc.) and includes one or more physical central processing units (CPUs) 203. Although not shown, in addition to physical CPUs 203, host machine 200 may also include a system memory, and non-volatile data storage, in addition to one or more physical network interfaces, such as PNIC 202, for communicating with other hardware computing platforms, entities, or host machines on a physical network accessible through PNIC 202.

Hypervisor 210 serves as an interface between virtual machines 220 and PNIC 202, as well as other physical resources (including physical CPUs 203) available on host machine 200. Each VM 220 is shown including a virtual network interface card (VNIC) 226, which is responsible for exchanging packets between VM 220 and hypervisor 210. Though shown as included in VMs 220, it should be understood that VNICs 226 may be implemented by code (e.g., VM monitor code) associated with hypervisor 210. VNICs 226 may be, in some cases, a software implementation of a physical network interface card. Each VM 220 is connected to a virtual port (vport) provided by virtual switch 214 through the VM's associated VNIC 226. Virtual switch 214 may serve as physical network switch, i.e., serve as an edge device on the physical network, but implemented in software. Virtual switch 214 is connected to PNIC 202 to allow network traffic to be exchanged between VMs 220 executing on host machine 200 and destinations on an external physical network.

In certain embodiments, each VNIC 226 may be configured to perform RSS. Accordingly, each VNIC 226 may be associated with a plurality of software based VNIC RSS queues 227 on a VM 220. Each of the VNIC RSS queues 227 may be associated with a virtual CPU (e.g., a different virtual CPU) from one or more virtual CPUs 225. As described in U.S. Patent Application Publication 2016/0085571, which is incorporated herein by reference, a virtual CPU may correspond to different resources (e.g., physical CPU or execution core, time slots, compute cycles, etc.) of one or more physical CPUs 203 of host machine 200. When receiving incoming packets (e.g., not including encapsulated ESP encrypted packets) VNIC 226 may compute a hash value based on header attributes of the incoming packets and distribute the incoming packets among the VNIC RSS queues 227 associated with VNIC 226. For example, different hash values may be mapped to different VNIC RSS queues 227. The incoming packets stored in each VNIC RSS queue 227 are then processed by the corresponding virtual CPU 225 associated with the VNIC RSS queue 227. Once a virtual CPU 225 is selected for processing an incoming packet stored in a certain VNIC RSS queue 227, the selected virtual CPU 225 begins running an interrupt handler invoked by the kernel in response to an interrupt issued by VNIC 226. The selected virtual CPU 225 then continues with further processing the packet by performing protocol processing (unless, as described below, another virtual CPU is selected, by a higher level packet steering module (e.g., Receive Packet Steering (RPS)) to handle the protocol processing).

Accordingly, using RSS, no single virtual CPU 225 is loaded with processing all incoming packets for VNIC 226. In addition, the processing of packets is distributed to different virtual CPUs 225 at the VNIC 226 and at the beginning of the processing pipeline for the packets, therefore taking advantage of distributed processing of packets at an early stage in the processing pipeline.

After the RSS at VNIC 226 distributes incoming network traffic for processing to a number of different virtual CPUs 225, as described above, to further load balance the distribution of the network traffic, in some cases, an additional kernel module, referred to as RPS, may be implemented in the kernel space of the VM's guest operating system. RPS may be a software implementation of RSS that is called later in the datapath of packets to further redistribute network traffic that has already distributed to the various virtual CPUs 225 by RSS. For example, as further described in relation to FIG. 3, RPS may be triggered after the packets are processed by the VNIC 226. Accordingly, for an incoming packet, the RSS may select a VNIC RSS queue 227 and, consequently, a corresponding virtual CPU 225 that begins processing the hardware interrupt handler, while the RPS may select the same or another virtual CPU for performing protocol processing. In some cases, RPS provides an additional software mechanism to ensure load balancing in the event that the hashing functions used by the RSS are not fairly distributing the incoming traffic among all virtual CPUs 225.

In some embodiments, a VM 220 is configured to perform the functions of a TEP. For example, VM $220_1$ may be configured as a TEP and include a TEP component 250 to implement TEP functions. VM $220_1$ may also be configured to implement IPsec protocols and functionality using an IPsec component 252. Further, another VM 220 may be configured as an EP associated with VM 220$_1$. For example, VM 220$_2$ may be an EP associated with the TEP VM 220$_1$. Accordingly, in some embodiments, another source EP may generate an IP packet to send to VM 220$_2$. The source EP may forward the IP packet to a source TEP, which encrypts (e.g., using an IPsec component 252) and encapsulates (e.g., using a TEP component 250) the packet using an IPsec protocol (e.g., ESP tunnel mode) to generate an encapsulated ESP encrypted data packet. The source TEP then sends the encapsulated ESP encrypted data packet to destination TEP VM 220$_1$. The encapsulated ESP encrypted data packet is, therefore, received at virtual switch 214 of host machine 200 via PNIC 202. Virtual switch 214 sends the encapsulated ESP encrypted data packet to VNIC 226 of VM 220$_1$.

However, as described above, in some cases, VNICs may not be configured to perform RSS for received encapsulated ESP encrypted data packets based on the packets' SPI values. Consequently, in such cases, because all the packets may have the same source and destination TEP IP addresses, the VNIC assigns all incoming encapsulated ESP encrypted data packets to the same RSS queue and, accordingly, the same virtual CPU for processing. As further described above, even if the VNIC is configured to perform RSS for received encapsulated ESP encrypted data packets, e.g., by taking into account the packets' SPI values when computing hash values, it is very unlikely that a statistically uniform distribution of packets to virtual CPUs results from the RSS.

Accordingly, certain embodiments described herein relate to installing an extensible, platform-independent, and generic packet filtering module, referred to as the extended Berkeley Packet Filter (eBPF), in the kernel space of the virtual machine's operating system and configuring the eBPF module to load balance IPsec tunnel processing. EBPF, initially referred to as the BPF, is an instruction set architecture for filtering packets in the kernel space of an operating system (e.g., Linux).

Figure 3:
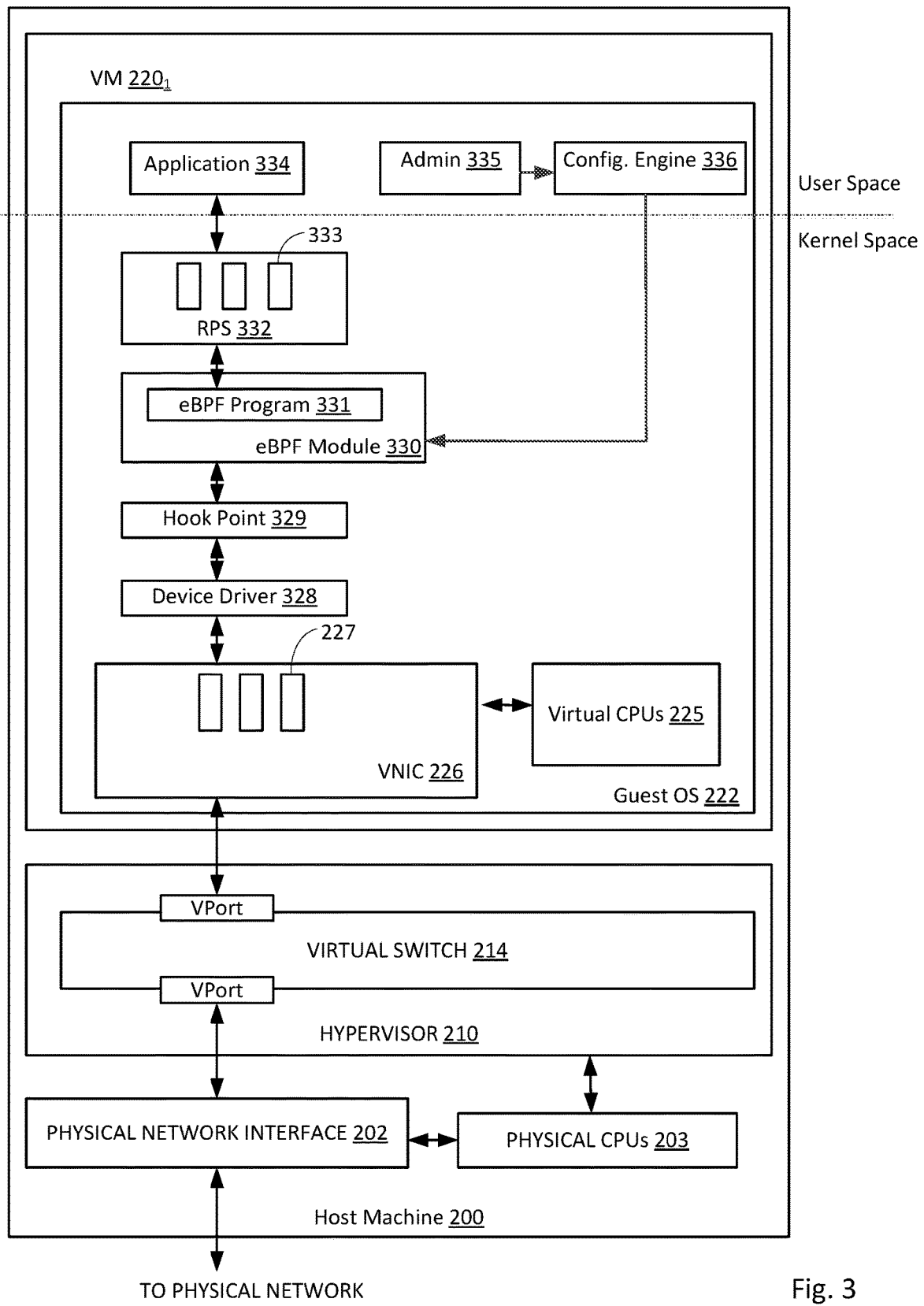
FIG. 3 illustrates an example eBPF module loaded into the kernel space of the host operating system residing on the host machine of FIG. 2, according to some embodiments.

FIG. 3 illustrates an example workflow diagram for loading eBPF module 330 into a guest OS 222's kernel space. Guest OS 222 may be an OS running on VM 220$_1$. As shown, eBPF module 330 includes eBPF program 331, which contains eBPF bytecode instructions for load balancing IPSec tunnel processing. Although shown as a single program, eBPF program 331 may comprise multiple eBPF programs. In some embodiments, eBPF module 330 may additionally contain eBPF maps that may store information to be shared and accessed by eBPF program 331 as well as user space applications. As illustrated by FIG. 3, eBPF module 330 is loaded into the kernel space of guest OS 222 by configuration engine 336. Configuration engine 336 may be used by admin 335 to install and configure eBPF module 330 as well as eBPF program 331 and eBPF map(s) therein.

In some embodiments, configuration engine 336 may include one or more components for configuring and loading eBPF module 330 in the kernel space of guest OS 222. For example, in some embodiments, configuration engine 336 may comprise a compiler and a loader. In some embodiments, the compiler may compile code written in other programming languages down to eBPF instructions. The compiler may then generate an ELF (executable and linkable format) file that contains the eBPF instructions. For example, admin 335 may provide configuration engine 336 with a certain source code for configuring eBPF module 330 to perform load balancing as further described herein. The source code, in one example, may contain code written in the C programming language, which the compiler takes as input and compiles down to eBPF instructions. In some embodiments, the compiler may be a LLVM+Clang compiler. LLVM (Low Level Virtual Machine) is a collection of modular and reusable compiler and toolchain technologies used to develop compiler front ends and back ends. Clang is a compiler front-end for a number of programming languages and uses LLVM as its back end.

After the ELF file is generated by the compiler, in some embodiments, the loader (e.g., IProute) takes the ELF file, parses information relating to the eBPF program 331 (e.g., eBPF program 331) and eBPF maps and issues BPF system calls (i.e., syscalls) to load the eBPF program 331 and eBPF maps (e.g., collectively shown as eBPF kernel module 330) into the kernel space of guest OS 222. The eBPF program 331 and maps are then attached to a desired hook point, which may be an entry point in code implementing a network stack in the kernel. As shown in FIG. 3, eBPF program 331 is attached to hook point 329, which runs shortly after device driver 328 receives a packet but before the packet reaches RPS 332.

EBPF operates in an event-driven model on a particular hook point (e.g., hook point 329). Each hook point has its own execution context and execution at the hook point only starts when a particular type of event occurs. For example, an eBPF program (e.g., eBPF program 331) attached to a raw socket interface (e.g., hook point 329) has a context, which includes the packet, and the eBPF program is only triggered to run when there is an incoming packet to the raw socket. As a result, once the eBPF kernel module 330 is hooked to hook point 329, any packets arriving at hook point 329 triggers the execution of eBPF program 331.

Within the kernel space of guest OS 222, eBPF instructions run in a virtual machine environment that interprets the eBPF code for virtual CPUs 225 to enable them to perform the eBPF instructions. For example, the virtual machine provides registers, stack space, a program counter, and helper functions. The eBPF virtual machine provides a completely isolated environment for its bytecode running inside. As a result, an eBPF program, for example, may not arbitrarily call other kernel functions or gain access into memory outside eBPF kernel module 330. To interact with components outside eBPF kernel module 330, the eBPF architecture provides a white-list of helper functions that an eBPF program is able to call, depending on the context of the eBPF program.

As described above, eBPF module 330 is attached to hook point 329, which runs shortly after device driver 328 that provides an interface for the network stack to communicate with VNIC 226. As further described above, VNIC 226 may not be configured to perform RSS for encapsulated ESP encrypted data packets received from virtual switch 214. Consequently, VNIC 226 may, for example, direct all encapsulated ESP encrypted data packets to only one of the VNIC RSS queues 227 and, consequently, only one of virtual CPUs 225 may be burdened with processing such packets. In some cases, as described above, VNIC 226 may be configured to perform RSS for encapsulated ESP encrypted data packets but fail to achieve an even distribution of the packets to virtual CPUs due to a low number of IPSec tunnels and/or security associations in the network. For example, VM 220$_1$ may include 6 virtual CPUs 225, while the RSS performed by VNIC 226 may result in distributing the incoming encapsulated ESP encrypted data packets among only two of the 6 virtual CPUs 225. Accordingly, eBPF program 331 is configured by configuration engine 336 to help perform load balancing for encapsulated ESP encrypted data packets.

Figure 4:
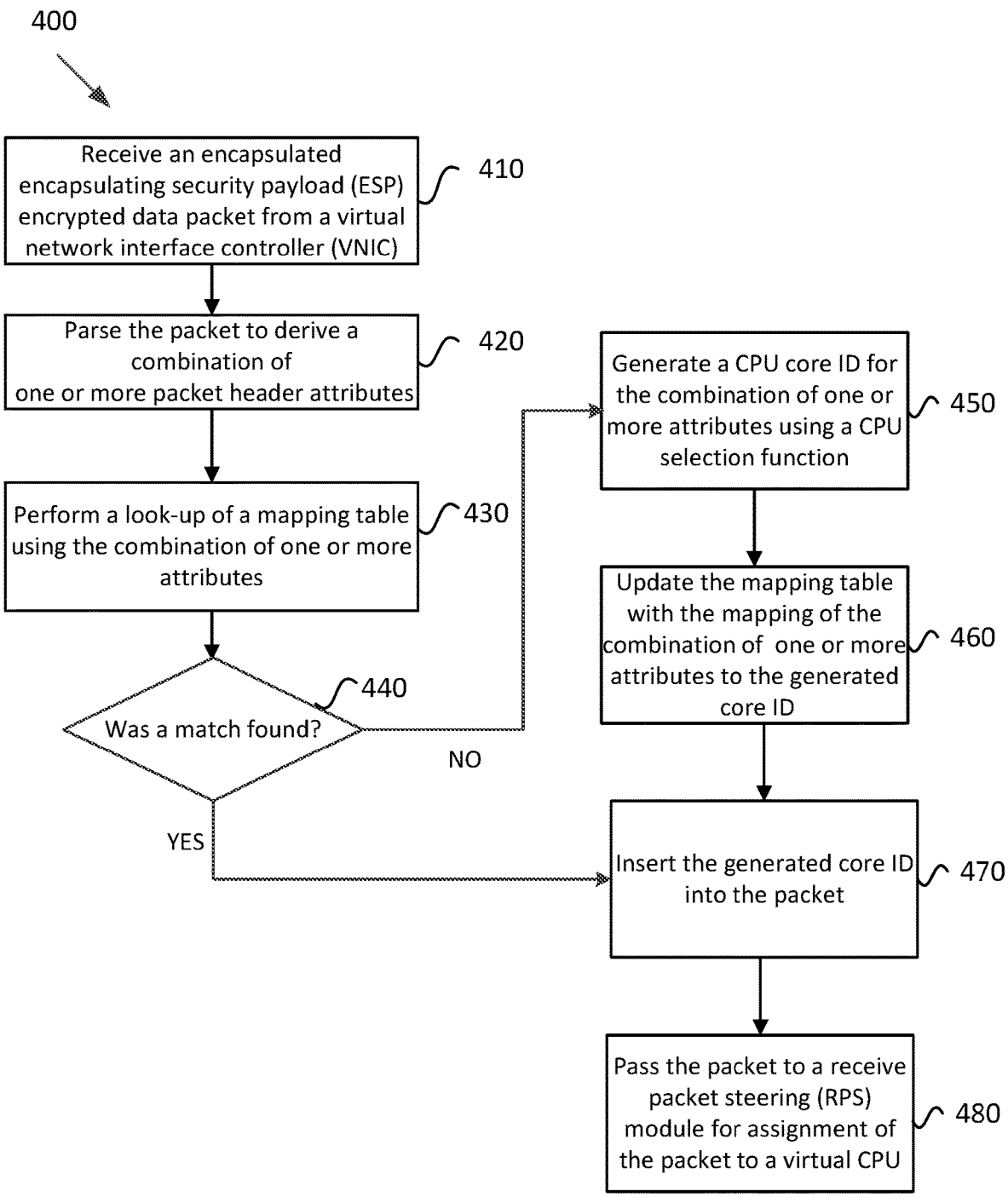
FIG. 4 illustrates example operations for use by the eBPF module of FIG. 3 for processing a packet, according to some embodiments.

FIG. 4 illustrates example operations 400 for use by eBPF module 330 for processing the encapsulated ESP encrypted data packet received from VNIC 226.

At 410, eBPF program 331 receives an encapsulated ESP encrypted data packet from VNIC 226. As described above, VNIC 226 may perform RSS and assign the encapsulated ESP encrypted data packet to a certain RSS queue 227 and, consequently, a corresponding virtual CPU. As a result, prior to being received by eBPF program 331, the packet may be inserted with the CPU core ID ("core ID") of the virtual CPU that the packet has been assigned to for processing. The core ID, in some embodiments, is inserted into the packet's metadata.

At 420, eBPF program 331 parses the packet to derive a combination of one or more packet header attributes or a tuple (e.g., source IP address, destination IP address, and/or SPI value, etc.).

At 430, eBPF program 331 performs a look-up of a mapping table using the combination of one or more packet header attributes. In some embodiments, eBPF program 331 may be configured with a mapping table that maintains mappings of various combinations of one or more packet header attributes to various CPU core IDs, each corresponding to a virtual CPU from a plurality of virtual CPUs 225. The mapping table may, in some embodiments, be in the form of a hash table. In some embodiments, instead of a table, eBPF program 331 may be configured with a hash function that performs the functions of the mapping table. Alternatively, any other types of mapping may be used for performing the functions of the mapping table.

At 440, eBPF program 331 determines if the combination of one or more packet header attributes matches an entry in the mapping table. If no match is found, eBPF program 331 executes step 450-480. However, if a match is found, eBPF program 331 executes steps 470-480, as shown.

At 450, eBPF program 331 generates a core ID for the combination of one or more packet header attributes using a CPU selection function. In general, the CPU selection function is configured to enable a more even distribution of the load level being handled by virtual CPUs 225.

In some embodiments, the CPU selection function is configured to generate a core ID for the combination of one or more tuples based on the amount of load being handled by each of the virtual CPUs 225. As an example, VM 220₁ may include four virtual CPUs 225, each of which may be handling varying amounts of load levels. In such an example, the CPU selection function takes the amount of load being handled by each of the virtual CPUs 225, as input, and generates the core ID of one of the virtual CPUs 225. In some embodiments, the CPU selection function may be configured to generate the core ID of a virtual CPU that is handling the least amount of load. In some embodiments, eBPF program 331 is able to obtain information about the amount of load being handled by virtual CPUs 225 by accessing eBPF maps that may store such information. EBPF program 331 may also obtain the information by interacting with other modules or components in the rest of the kernel space. EBPF program 331 is able to access eBPF maps and also interact with the rest of the kernel space through a whitelisted set of helper functions.

In some embodiments, the CPU selection function is configured to generate core IDs in a round robin fashion. As an example, the CPU selection function may receive four consecutive packets, each having a unique combination of packet header attributes for which an entry is not found in the mapping table. In such an example, for packet 1, the CPU selection function may generate the core ID of virtual CPU 1. The CPU selection function may then generate the core ID of virtual CPU 2 for packet 2, followed by the core ID of virtual CPU 3 for packet 3 and the core ID of virtual CPU 4 for packet 4. After the fourth packet the CPU selection function round-robins to virtual CPU 1 again such that for a fifth packet the CPU selection function generates the core ID of virtual CPU 1, etc. It should be noted that the order in which core IDs are selecting in round-robin fashion may be different than described and be any suitable ordering.

Accordingly, using the CPU selection function, eBPF program 331 is able to generate a core ID of a virtual CPU for a combination of one or more packet header attributes corresponding to an incoming encapsulated ESP encrypted data packet. In some embodiments, the CPU selection function may be a hash function.

At 460, eBPF program 331 updates its mapping table with a mapping of the combination of one or more tuples to the generated core ID. For example, eBPF program 331 may store an entry of the combination of one or more packet header attributes that corresponds to the generated core ID. As a result, after the update, a subsequent look-up of the mapping table using the same combination of one or more packet header attributes results in a mapping to the generated core ID. This is to ensure that eBPF program 331 generates the same core ID for packets with the same combination of one or more packet header attributes. As a result of this, all packets with the same combination of one or more packet header attributes (i.e., packets from the same flow) are assigned to the same virtual CPU and are, therefore, not processed out of order.

In some embodiments, the security associations between EPs may change periodically (e.g., after a certain amount of time, after a certain amount of data has been exchanged, etc.). Accordingly, the SPI values associated with the security associations between EPs may change periodically. As a result, eBPF program 331 may periodically receive encapsulated ESP encrypted packets from the same flow (e.g., same source EP and destination EP) but different SPI values. Each time the SPI value associated with packets from a certain flow changes, the resulting combination of one or more packet header attributes, derived by eBPF program 331 from parsing the packets, also changes. Consequently, a look-up of the mapping table may not return any results and, therefore, eBPF program 331 may proceed to treat a packet, from the same flow but a different SPI value, as a packet that can be processed by a virtual CPU other than the virtual CPU that had been selected to process previous packets from the same flow. This may result in packets from the same flow being processed out of order as one virtual CPU may process packets at different times or rates than another virtual CPU.

In order to prevent such out of order processing of packets, in certain embodiments, IPSec 252 may indicate to configuration engine 336 that the SPI value for a certain source EP and destination EP has changed. In response, configuration engine 336 may configure and load a new mapping table into eBPF program 331 to ensure that eBPF program 331 continues to generate the same core ID for packets from the same flow but with a different SPI value. In addition, IPSec 252 may also inform configuration engine 336 upon the removal of an IPSec tunnel between a source TEP and the destination TEP (e.g., VM 220₁) and also the removal of a security association between a source EP and a destination EP. As an example, source EP 110 and destination EP 120 may have established a security association among each other with SPI value X for packets being sent from EP 110 to EP 120. EBPF program 331 may then generate the core ID of, for example, virtual CPU 1 for ingress packets with SPI value X. After a certain amount of time, the security association between source EP 110 and destination EP 120 may be relinquished, in which case, SPI value X that was previously used by the relinquished security association may no longer be used or it may be used for another newly established security association between other EPs. As a result, changing the mapping table of eBPF program 331 ensures that eBPF program 331 does not continue to treat packets with SPI value X as part of the same flow etc.

At 470, eBPF program 331 inserts the generated core ID into the packet (e.g., in the packet's metadata). For example, as described above, the packet may already include a core ID field, that may have been set to a certain value by VNIC 226. In such an example, EBPF program 331 then replaces the old core ID value with the core ID that eBPF program 331 generated using the CPU selection function.

At 480, eBPF program 331 passes the packet to RPS module 332 for assignment of the packet to the virtual CPU whose core ID is inserted in the packet. As described above, RPS 332 may further redistribute incoming network traffic if it determines that the incoming network traffic is not already fairly distributed among various virtual CPUs by lower level kernel modules. However, by parsing the core IDs included in packets received from eBPF kernel module 330, RPS 332 is able to determine that assigning the packets to virtual CPUs based on the core IDs inserted in each packet by eBPF module 330 results in a fair distribution of the packets among the virtual CPUs. As a result, in some embodiments, RPS 332 may not perform any additional load balancing and proceed with assigning the packets to different RPS queues 333, each corresponding to one of virtual CPUs 225, based on the packets' core IDs. After a certain amount of time, each packet may be then assigned to a virtual CPU from virtual CPUs 225 based on the RPS queue 333 it has been assigned to. The virtual CPU then processes the encapsulated ESP encrypted data packet. For example, the virtual CPU is used to decapsulate (e.g., using TEP component 250) and decrypt (e.g., using IPsec component 252) the packet. The original IP packet is then sent to virtual switch 214, which forwards the packet to VM 220₂.

Referring back to step 440 of flow diagram 400, if a matching entry is found as a result of eBPF program 331 performing a look-up of its mapping table at step 430, eBPF program 331 may then proceed to step 470 by inserting the core ID, that resulted from the look-up, into the packet. After inserting the core ID into the packet, at 480, eBPF program 331 passes the packet to RPS 332 for assignment of the packet to a virtual CPU, as described above.

In some embodiments, instead of installing and configuring an eBPF module 330 to load balance IPSec tunnels, the kernel of guest OS 222 may be reconfigured to perform the load balancing. For example, the kernel code implementing a network stack (e.g., residing between device driver 328 and RPS 332) may be reconfigured, as discussed above, for parsing incoming encapsulated ESP encrypted packets, generating core IDs for each packet based on the packets' header attributes, inserting the core IDs in the packets, and passing the packets to the RPS module 332.

In host machine 200, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at run-time. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker-.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for processing encapsulated encrypted data packets at an extended Berkeley Packet Filter (eBPF) module on a host machine, comprising:

receiving, at the eBPF module, an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint;

selecting a CPU core ID from a plurality of CPU cored IDs based at least in part on the SPI value, wherein the CPU core ID corresponds to a virtual CPU of a plurality of virtual CPUs; and inserting the CPU core ID into the encapsulated encrypted data packet;

passing the encapsulated encrypted data packet to a receive packet steering (RPS) module for assignment of the encapsulated encrypted data packet to the virtual CPU based on the CPU core ID.

2. The method of claim 1, further comprising:

parsing the packet to determine the SPI value and at least one of the source IP address of the source tunnel endpoint and the destination IP address of the destination tunnel endpoint;

performing a look-up of a mapping table stored in the eBPF module using the SPI value and the at least one of the source IP address of the source tunnel endpoint and the destination IP address of the destination tunnel endpoint; and determining if a matching entry for the SPI value and the at least one of the source IP address of the source tunnel endpoint and the destination IP address of the destination tunnel endpoint is found in the mapping table, prior to the selecting.

3. The method of claim 2, wherein the selecting further comprises selecting the CPU core ID using a CPU selection function upon determining that no matching entry is found.

4. The method of claim 3, wherein the CPU selection function uses a load level of each of the plurality of virtual CPUs as input.

5. The method of claim 4, wherein a load level of the virtual CPU is lowest among load levels of the plurality of virtual CPUs.

6. The method of claim 3, wherein the CPU selection function performs the selecting using a round-robin mechanism.

7. The method of claim 1, wherein the eBPF module is configured by a configuration engine.

8. The method of claim 7, wherein the mapping table is replaced by the configuration engine in response to an event.

9. The method of claim 8, wherein the event comprises a change in the SPI value corresponding to the security association between the source endpoint and the destination endpoint.

10. The method of claim 1, further comprising:

storing a mapping of the SPI value to the selected CPU core ID in the mapping table, prior to the passing.

11. A non-transitory computer readable medium comprising instructions to be executed in a computer system, wherein the instructions when executed in the computer system perform a method for processing encapsulated encrypted data packets at an extended Berkeley Packet Filter (eBPF) module on a host machine, the method comprising:

receiving, at the eBPF module, an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint;

selecting a CPU core ID from a plurality of CPU cored IDs based at least in part on the SPI value, wherein the CPU core ID corresponds to a virtual CPU of a plurality of virtual CPUs; and inserting the CPU core ID into the encapsulated encrypted data packet;

passing the encapsulated encrypted data packet to a receive packet steering (RPS) module for assignment of the encapsulated encrypted data packet to the virtual CPU based on the CPU core ID.

12. The non-transitory computer readable medium of claim 11, wherein the method further comprises:

parsing the packet to determine the SPI value and at least one of the source IP address of the source tunnel endpoint and the destination IP address of the destination tunnel endpoint;

performing a look-up of a mapping table stored in the eBPF module using the SPI value and the at least one of the source IP address of the source tunnel endpoint and the destination IP address of the destination tunnel endpoint; and determining if a matching entry for the SPI value and the at least one of the source IP address of the source tunnel endpoint and the destination IP address of the destination tunnel endpoint is found in the mapping table, prior to the selecting.

13. The non-transitory computer readable medium of claim 12, wherein the selecting further comprises selecting the CPU core ID using a CPU selection function upon determining that no matching entry is found.

14. The non-transitory computer readable medium of claim 13, wherein the CPU selection function uses a load level of each of the plurality of virtual CPUs as input.

15. The non-transitory computer readable medium of claim 14, wherein a load level of the virtual CPU is lowest among load levels of the plurality of virtual CPUs.

16. The non-transitory computer readable medium of claim 13, wherein the CPU selection function performs the selecting using a round-robin mechanism.

17. The non-transitory computer readable medium of claim 11, wherein the eBPF module is configured by a configuration engine.

18. The non-transitory computer readable medium of claim 17, wherein the mapping table is replaced by the configuration engine in response to an event.

19. The non-transitory computer readable medium of claim 18, wherein the event comprises a change in the SPI value corresponding to the security association between the source endpoint and the destination endpoint.

20. The non-transitory computer readable medium of claim 11, wherein the method further comprises:

storing a mapping of the SPI value to the selected CPU core ID in the mapping table, prior to the passing.

21. A computer system, wherein system software for the computer system is programmed to execute a method for processing encapsulated encrypted data packets at an extended Berkeley Packet Filter (eBPF) module on a host machine, the method comprising:

receiving, at the eBPF module, an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint;

selecting a CPU core ID from a plurality of CPU cored IDs based at least in part on the SPI value, wherein the CPU core ID corresponds to a virtual CPU of a plurality of virtual CPUs; and inserting the CPU core ID into the encapsulated encrypted data packet;

passing the encapsulated encrypted data packet to a receive packet steering (RPS) module for assignment of the encapsulated encrypted data packet to the virtual CPU based on the CPU core ID.

22. The computer system of claim 21, wherein the method further comprises:

parsing the packet to determine the SPI value and at least one of the source IP address of the source tunnel endpoint and the destination IP address of the destination tunnel endpoint;

performing a look-up of a mapping table stored in the eBPF module using the SPI value and the at least one of the source IP address of the source tunnel endpoint and the destination IP address of the destination tunnel endpoint; and determining if a matching entry for the SPI value and the at least one of the source IP address of the source tunnel endpoint and the destination IP address of the destination tunnel endpoint is found in the mapping table, prior to the selecting.

23. The computer system of claim 22, wherein the selecting further comprises selecting the CPU core ID using a CPU selection function upon determining that no matching entry is found.

24. The computer system of claim 23, wherein the CPU selection function uses a load level of each of the plurality of virtual CPUs as input.

25. The computer system of claim 24, wherein a load level of the virtual CPU is lowest among load levels of the plurality of virtual CPUs.

26. The computer system of claim 23, wherein the CPU selection function performs the selecting using a round-robin mechanism.

27. The computer system of claim 21, wherein the eBPF module is configured by a configuration engine.

28. The computer system of claim 27, wherein the mapping table is replaced by the configuration engine in response to an event.

29. The computer system of claim 28, wherein the event comprises a change in the SPI value corresponding to the security association between the source endpoint and the destination endpoint.

30. The computer system of claim 21, wherein the method further comprises:
   storing a mapping of the SPI value to the selected CPU core ID in the mapping table, prior to the passing.

* * * * *